(12) United States Patent
Salomon et al.

(10) Patent No.: US 6,369,841 B1
(45) Date of Patent: *Apr. 9, 2002

(54) GRAPHICAL USER INTERFACE FOR THE PROGRAMMING OF PROGRAMMABLE CONTROLLERS

(75) Inventors: Oliver Salomon, Lauf; Manfred Witte, Erlangen; Stefan Elsterer, Nürnberg, all of (DE)

(73) Assignee: Siemens Aktiengesellschaft, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,848

(22) Filed: Jul. 27, 1998

Related U.S. Application Data

(63) Continuation of application No. PCT/EP97/00100, filed on Jan. 10, 1997.

(30) Foreign Application Priority Data

Jan. 25, 1996 (EP) ............................................. 96101067

(51) Int. Cl.[7] .................................................. G09G 5/00
(52) U.S. Cl. .......................... 345/854; 700/83; 700/17; 700/18; 345/853; 345/965
(58) Field of Search ................................ 364/146, 147, 364/474.22; 345/356, 967, 970, 965, 854, 522; 700/83, 17, 18, 180

(56) References Cited

U.S. PATENT DOCUMENTS

| | | | |
|---|---|---|---|
| 4,914,568 A | | 4/1990 | Kodosky et al. |
| 5,291,587 A | * | 3/1994 | Kodosky ..................... 345/333 |
| 5,381,524 A | * | 1/1995 | Lewis ......................... 345/346 |
| 5,386,362 A | * | 1/1995 | Keret .......................... 364/479 |

(List continued on next page.)

FOREIGN PATENT DOCUMENTS

EP 0549510 6/1993

OTHER PUBLICATIONS

Dellen et al., "Automated Code Generation From Graphical, Reusable Templates", Proceedings of the 10th IEEE/AIAA Digital Avionics Systems Conf., Oct. 14–17, 1991, Los Angeles, USA, pp. 299–304.

Holder, Manfred, "SPS–Esperanto", industrie–elektrik + elektronik Maschinenausrüstung + Automatisierung, Jan. 1988, No. 1, pp. 16–18.

*Primary Examiner*—Raymond J. Bayerl
*Assistant Examiner*—Thomas J Joseph
(74) *Attorney, Agent, or Firm*—Sughrue Mion, PLLC

(57) ABSTRACT

The user interface contains a project window (9, 90, FIGS. 2, 3) for interfaces (clips) of a programmable controller and programming windows (20, FIGS. 4, 10, 13; 67, FIG. 16) for each output interface of the programmable controller. Each such programming window (20, 67) contains a base node as a first graphical operating element (21, FIG. 10; 68, FIG. 16) for the output interface of the particular programming window and at least one additional node which serves as a graphical operating element (35, 47, 49, 51, 53, FIG. 13) for another interface (clip) or for a group of linked interfaces of the programmable controller. Each node has an output branch line (44, 48, 50, 52, 54, FIG. 13), the end of which can be routed to the base node or to another node by means of an operating means, such as a mouse. After the end of the output branch line is deposited on a respective other node, both a graphical link between the nodes and a controlsystem link between the interfaces which the nodes represent (FIGS. 11, 12, 13) are produced. The user interface renders it possible even for users who have no experience with planning and design of controllers to produce a control program in a simple and error-free manner.

22 Claims, 13 Drawing Sheets

U.S. PATENT DOCUMENTS

| | | | | |
|---|---|---|---|---|
| 5,481,741 A | * | 1/1996 | McKaskle et al. | 345/522 |
| 5,598,418 A | * | 1/1997 | Lo et al. | 370/501 |
| 5,623,401 A | * | 4/1997 | Baxter | 364/147 |
| 5,745,686 A | * | 4/1998 | Saito et al. | 709/224 |
| 5,801,702 A | * | 9/1998 | Dolan et al. | 345/854 |
| 5,805,931 A | * | 9/1998 | Morzano et al. | 710/64 |
| 5,831,869 A | * | 11/1998 | Ellis et al. | 716/6 |
| 5,877,766 A | * | 3/1999 | Bates et al. | 345/854 |
| 5,910,803 A | * | 6/1999 | Grau et al. | 345/854 |
| RE36,444 E | * | 12/1999 | Sanchez-Frank | 345/349 |

\* cited by examiner

GRAPHICAL USER INTERFACE FOR THE PROGRAMMING OF PROGRAMMABLE CONTROLLERS

This is a Continuation of International Application PCT/EP97/00100, with an international filing date of Jan. 10, 1997, the disclosure of which is incorporated into this application by reference.

FIELD OF AND BACKGROUND OF THE INVENTION

The invention relates to new and useful improvements in graphical user interfaces. More particularly, the invention relates to graphical user interfaces based on the "Windows"® operating system in the "personal computer" class, which are widely used in the operation of computer programs. Such interfaces are known to offer virtually self-explanatory, intuitive control of computer programs even for inexperienced persons. One basis for the simplified operating characteristics consists of modern operating devices for computers, in particular the "mouse", which make the operating elements of graphical user interfaces particularly accessible.

In the area of industrial data processing, in particular the processing of production data in technical processes, such as by means of programmable controllers, the work of planning and designing process control programs is often carried out on something like a command code level. In this process, control instructions directed toward the inputs and outputs of the controller must be compiled in a special programming language, for example STEP 5 or STEP 7 language of the SIEMENS Company to form a so-called sequence control. Working with programming tools of this kind requires, at a minimum, prior knowledge and technical experience. Consequently this is possible at best for the operating personnel, for example, of production technology systems in which programmable controllers are employed.

The periodical "industrie-elektrik+elektronik," Maschinenausrüstung+Automatisierung, Volume 1, January 1988, describes a system-independent programming system for controllers under the title "SPS-Esperanto" (incorporated herein by reference). This CAD/CAM software package is a graphical programmer tool for the programming of programmable controllers. In the process, the desired control task can be described by means of graphical modules, connecting lines, and comments. Other references directed to graphical systems include: U.S. Pat. No. 4,914,568 to Kodosky et al.; EP 0 549 510 A2 to Chang et al.; and Dellen et al., "Automated Code Generation from Graphical, Reusable Templates", Proceedings of the 10th Digital Avionics Systems Conference, Oct. 14–17, 1991, each of which is incorporated herein by reference.

OBJECTS OF THE INVENTION

It is intended to make simple programmable controllers available to a broad circle of predominantly nonprofessional people. This group can use programmable controllers in many ways, such as in domestic installations. For them, however the use of conventional programming tools at a level similar to command code is not possible.

Accordingly, one object of the invention is to provide a graphical user interface for the programming of programmable controllers which even inexperienced users from the non-industrial sector can manage.

SUMMARY OF THE INVENTION

This and other objects are achieved by means of the graphical user interface of the independent claims. In particular, the invention provides both a graphical user interface and a method for programming a programmable controller. The interface includes a plurality of output interfaces and a plurality of programming windows assigned respectively to each of the output interfaces. Each one of the programming windows contains, first, a base node as a first graphical operating element for the output interface for that particular programming window as well as, second, at least one additional node as an additional graphical operating element for an input interface or for a group of linked interfaces of the programmable controller. The additional node includes at least one output branch line having a free end which is actuable to be coupled to the base node or to some further additional node by operating a graphical operating means such as a computer mouse. Coupling the free end of the output branch line of the additional node to the base node or to the further additional node establishes both a graphical and a control-system linkage between the coupled nodes. Further advantageous embodiments of the invention are the subject matter of the dependent claims.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 1:
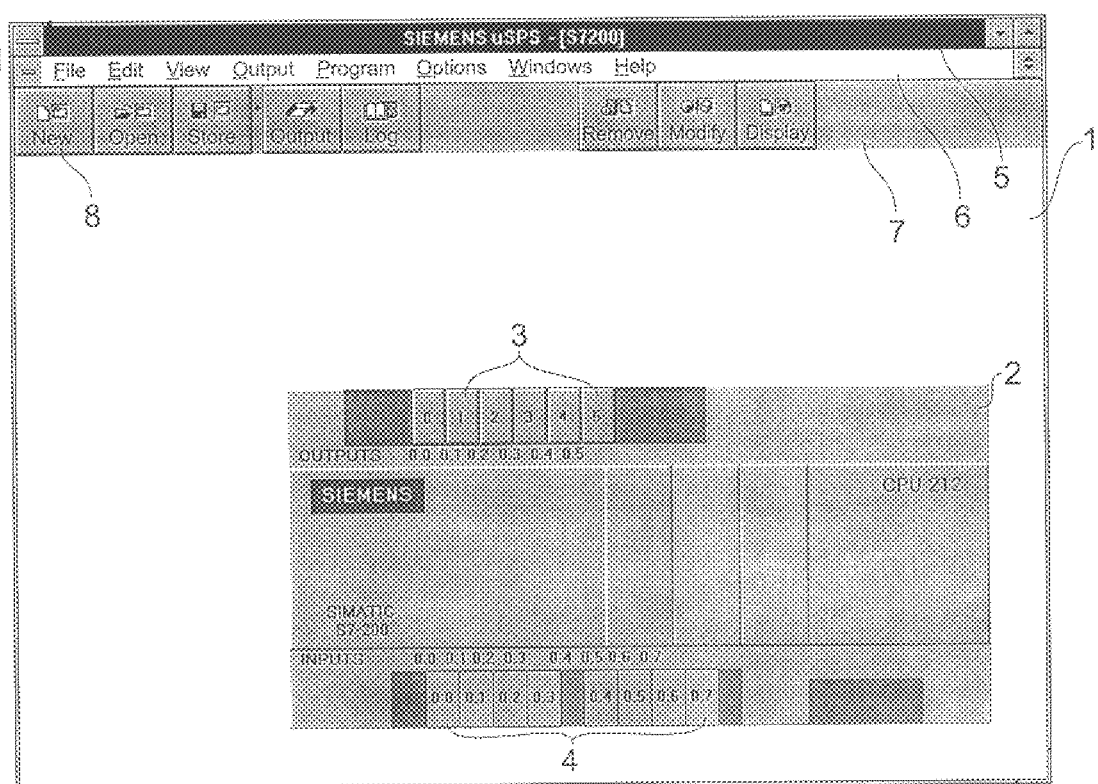
FIG. 1 shows, by way of example, a main program window of the user interface in accordance with the invention.

FIG. 1 shows one example of a main program window 1 of the user interface in accordance with the invention. In a program and file display bar 5 at the top end of the main program window, the respective program name, for example SIEMENSuSPS, and the current file name, for example [S7200], are displayed in a way conforming to, e.g., the so-called Windows® standard. A menu bar 6 located thereunder provides access to customary, so-called pull-down menus FILE, EDIT, VIEW . . . HELP, by means of which commonly used program control entries can be inputted. In an additional command button bar 7 located thereunder, i.e., a "tool bar", there are command buttons by the operation of which, for example using a "computer mouse", frequently required, especially program-specific, graphical operator control elements of the user interface are accessible. Thus, for example, using the command button 8 "new", a new "project window" of the user interface in accordance with the invention can be generated. Its appearance and function will be explained in more detail below.

The program symbol 2 of a programmable controller for which a control program is to be edited using the graphical user interface in accordance with the invention is represented, by way of example, in the actual display area under the bars 5, 6 and 7 in the main program window of FIG. 1. Displayed in the program window are, in particular, the "output clips" 3 available with the respective hardware, i.e., terminal elements for binary and analog outputs 0.0, 0.1 . . . and the available "input clips" 4, i.e., terminal elements for binary and analog inputs 0.0, 0.1 . . . of the programmable controller.

Figure 2:
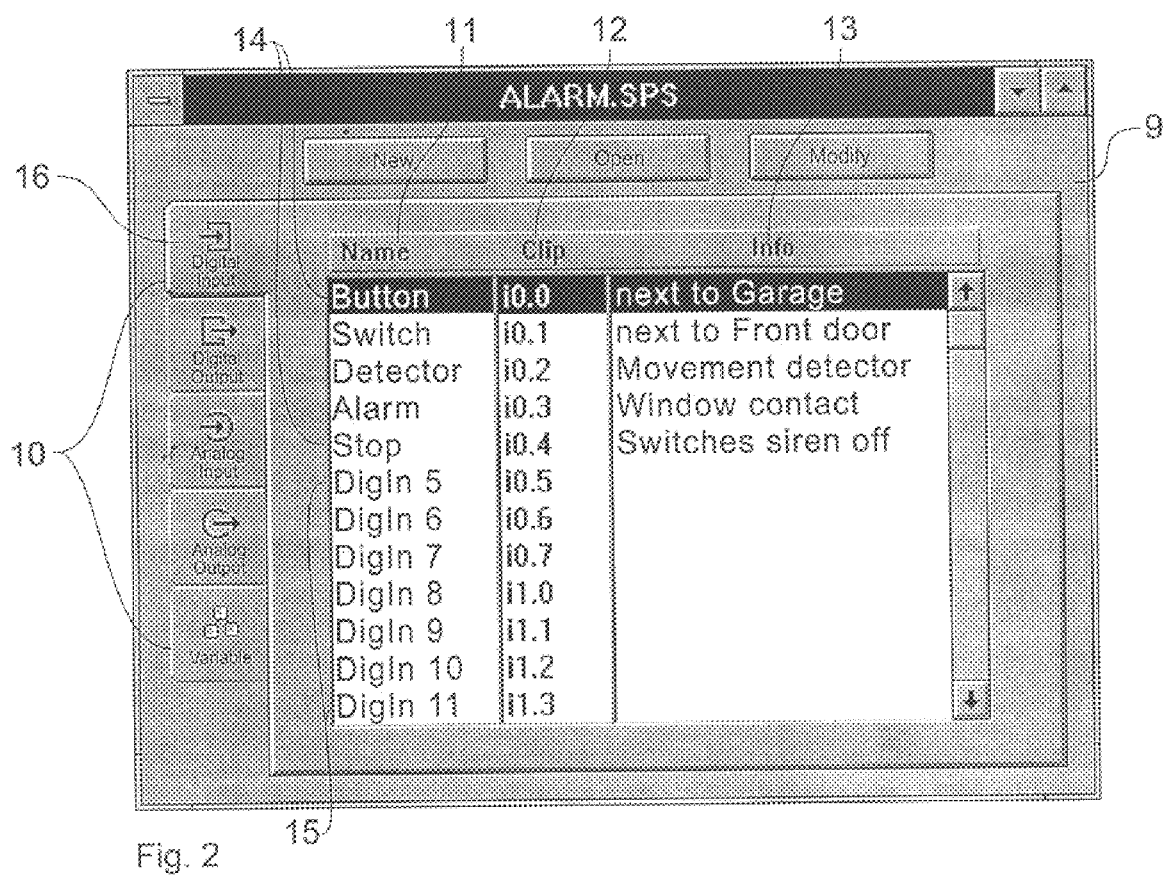
FIG. 2 shows, by way of example, a project window of the user interface in accordance with the invention, with the digital inputs of the programmable controller indicated.
Figure 3:
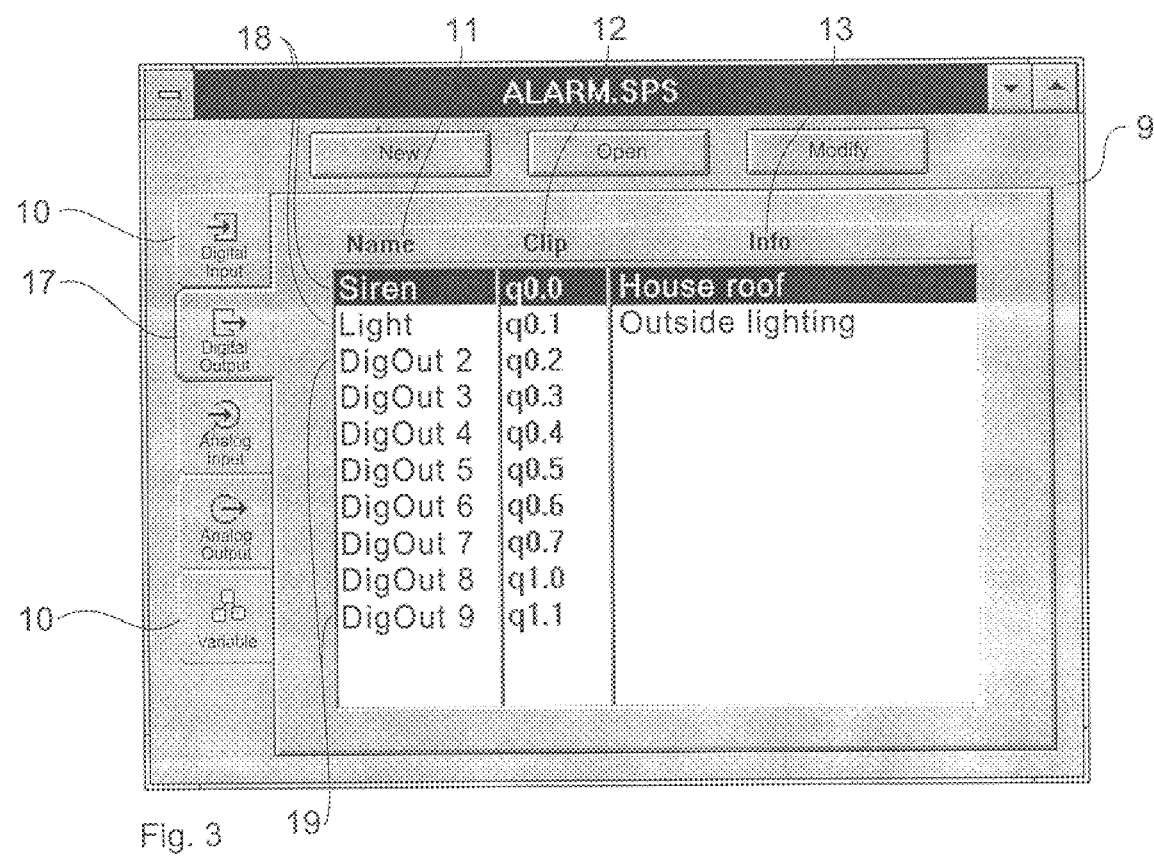
FIG. 3 shows the exemplary project window of FIG. 2 with the digital outputs of the programmable controller indicated.

With reference to FIGS. 2 and 3, a first, preferred element of the graphical user interface in accordance with the invention for programming programmable controllers, the "project window", is explained below. In this project window, the interfaces, i.e., the "clips", of the respective programmable controller, are advantageously grouped together. Preferably these clips can also be provided with application-dependent comments in the project window.

In project window 9 (represented by way of example in FIG. 2) there are displayed, e.g., all the interfaces of the programmable controller of the "digital input" type which are associated with a control program with the name ALARM.SPS. The designation of the terminal element of the respective interface of the programmable controller, i.e., clip numbers i0.0, . . . , i0.7, i.0, . . . , in clip column 12 preferably corresponds in this case to the representation in the program symbol 2 of the programmable controller in the main program window 1 from FIG. 1. In the adjacent name column 11 and information column 13, application-specific "Name" and additional application-specific "Information" for the interfaces can be inputted. Thus the first five "digital inputs" are occupied, by way of example, by interface elements which may occur in the case of a house alarm system. These are illustrated as occupied input clips 14. Thus a BUTTON mounted "next to the garage" is connected at Clip i01. Furthermore, at Clip i0.1 of the controller a SWITCH is connected; at Clip i0.2, a DETECTOR; at Clip i0.3, an ALARM-emitting element such as a window contact; and finally at Clip i0.4, an element which causes a STOP such as for switching off a siren. The additional input Clips 15 are not occupied in the example so that "presettings" DigIn5, DigIn6, . . . for the additional "digital inputs" of the controller which are not occupied are advantageously displayed in the project window 9 of FIG. 2 in columns 11 and 13.

The interfaces of the programmable controller are advantageously grouped together in the project window such that they are sorted according to their respective functions in graphical folders which can be activated by means of command buttons 10. Such a configuration is already represented in the examples of FIGS. 2 and 3. For instance, in FIG. 2, the folder for displaying the "digital inputs" of the programmable controller is activated by means of a corresponding digital input command button 16, while in FIG. 3 the folder for displaying the "digital outputs" of the programmable controller is activated by means of a corresponding digital output command button 17. In the case of the exemplary project window in FIGS. 2 and 3, folders are also provided for the "analog inputs" and "analog outputs" and also for "variables" of the programmable controller.

In the exemplary project window 9 depicted in FIG. 3, all the interfaces of the programmable controller of the "digital output" type which are associated with the control program ALARM.SPS from FIG. 2 are displayed by way of example. The designations of the terminal elements of the respective interfaces of the programmable controller, i.e., the numbering q0.0, . . . , q.7, q1.0, q1.1 for the clips in clip column 12, preferably corresponds in this case in turn to the representation in program symbol 2 of the programmable controller in the main program window 1 from FIG. 1. In the adjacent name column 11 and information column 13, application-specific "Names" and additional application-specific "Information" for the interfaces may likewise be inputted. Thus for example, the first two "digital outputs" are occupied by interface elements which may occur in the case of a house alarm system. These are illustrated as occupied output clips 18. Thus a SIREN is connected at Clip q0.0, which siren according to further INFO is mounted on the "roof of the house". Furthermore, an element giving LIGHT, for example, a lamp, is connected at Clip q0.1 of the controller. The additional output clips 19 are not occupied in the example so that the so-called presettings DigOut2, DigOut3, . . . for additional, unoccupied "digital outputs" of the controller can be advantageously displayed in the project window 9 from FIG. 3 in columns 11 and 13.

In accordance with the invention, the graphical user interface at a minimum contains a specific programming window for each output interface of the programmable controller. In accordance with the invention, such a programming window in turn contains a so-called base node as a first graphical interface. Furthermore, it has at least one additional node for the programming, particularly of switching sequences of the programmable controller. This additional node serves as a graphical operator control element for another interface or for a group of interfaces of the programmable controller that are, in particular, linked to form a so-called VARIABLE. In each case, the nodes have an output branch line, the end of which can be routed by a graphical operator control means to the base node or to some other node. An input device such as a computer mouse may preferably be used as the graphical user control means, at least for routing the output branch lines of the nodes. In accordance with the invention, after the end of such an output branch line is deposited on the respective other node, a linkage is established between the nodes which is graphically visible on the user interface. In addition, a control system linkage is established between the interfaces representing the nodes. A program system transfer of current output values then takes place between the nodes via these interfaces.

Figure 4:
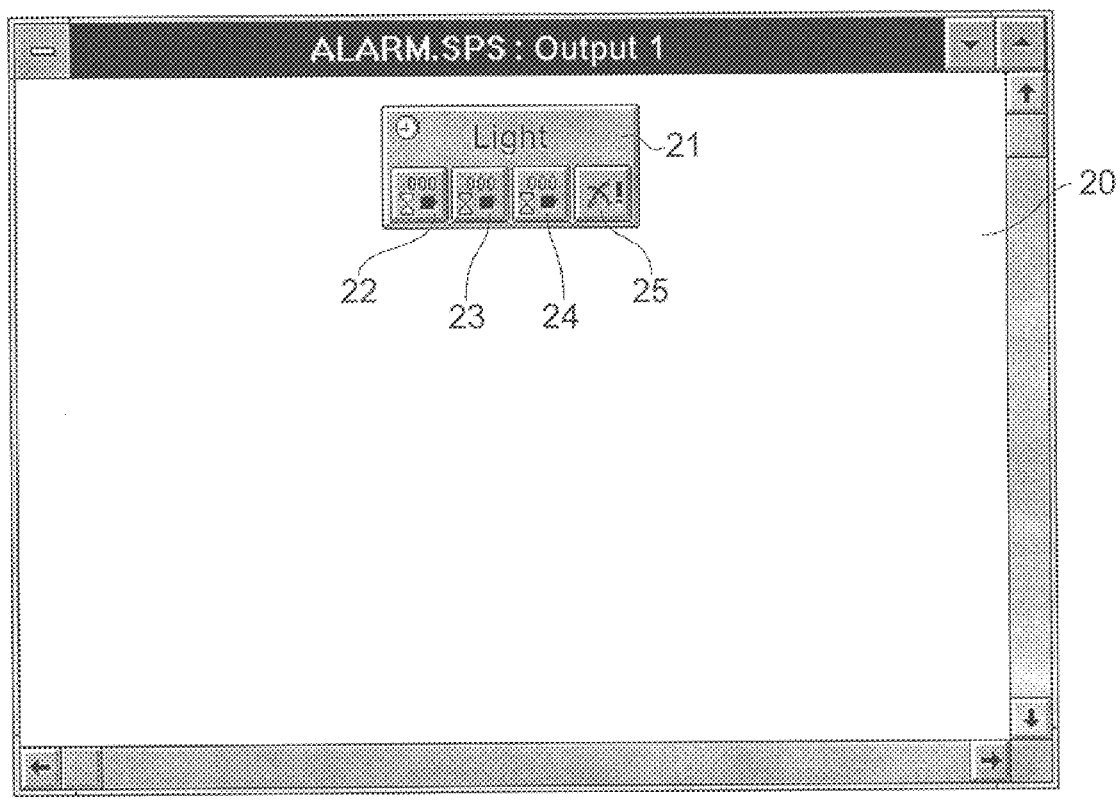
FIG. 4 shows, by way of example, a programming window of the user interface in accordance with the invention which is associated with the digital output 1 of the exemplary project window from FIG. 3 and in which an associated base node is indicated.

In FIG. 4, a program window 20 is represented by way of example which is associated with the output interface "output 1" contained in FIG. 3 with the name LIGHT and the clip number q0.1 of the project ALARM.SPS. In accordance with the invention, this output interface is visually represented by the base node 21, denoted by LIGHT, and is accessible for the purpose of graphical planning and design. Base node 21 is shown with branch inputs 22, 23, 23, and 25. For the purpose of graphical planning and design, the node of at least one other interface or the node of a group of interfaces of the programmable controller which are linked, in particular to form a so-called VARIABLE are placed in the program window.

Figure 13:
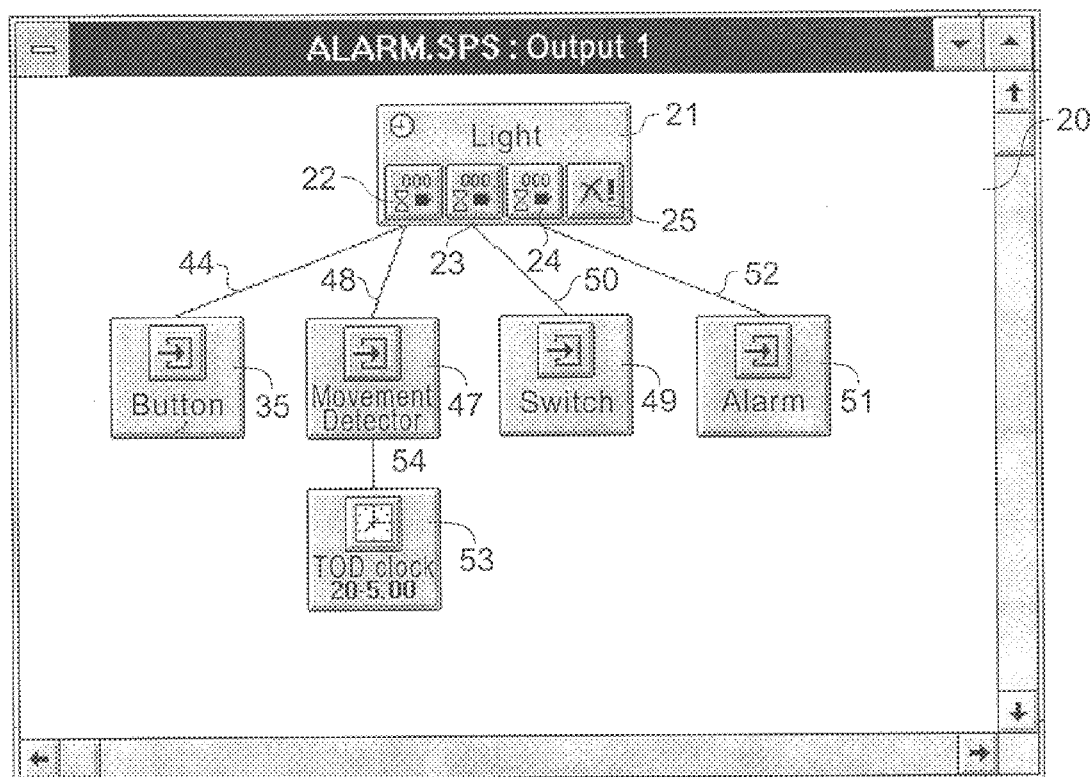
FIG. 13 shows the exemplary programming window of FIG. 4 or 10 in which nodes from the project window of FIG. 2 are connected in accordance with the invention by graphical program linkage to form a control program for output 1 of a programmable controller according to the project window of FIG. 3.

In accordance with a preferred embodiment of the graphical user interface in accordance with the invention, nodes can be generated and linked in a programming window by means of which time delays for preceding nodes, representing output signals of other interfaces, can be parameterized. Such a node of the type "weekly calendar" is represented in the example of FIG. 13. The output branch line 54 of this node 53 is connected to the input of node 47. The logical AND linkage of the output signals of nodes 53 and 47 that is produced as a result causes an active signal to occur on output branch line 48 only if both the DETECTOR node 47 has detected a MOVEMENT and node 53 TODClock signals a point of time lying in the period of time from 8:00 p.m. to 5:00 a.m. The application-dependent parameterization of node 53 may be performed with the aid of a dialog window comparable to the window from FIG. 14, described in greater detail below.

Figure 5:
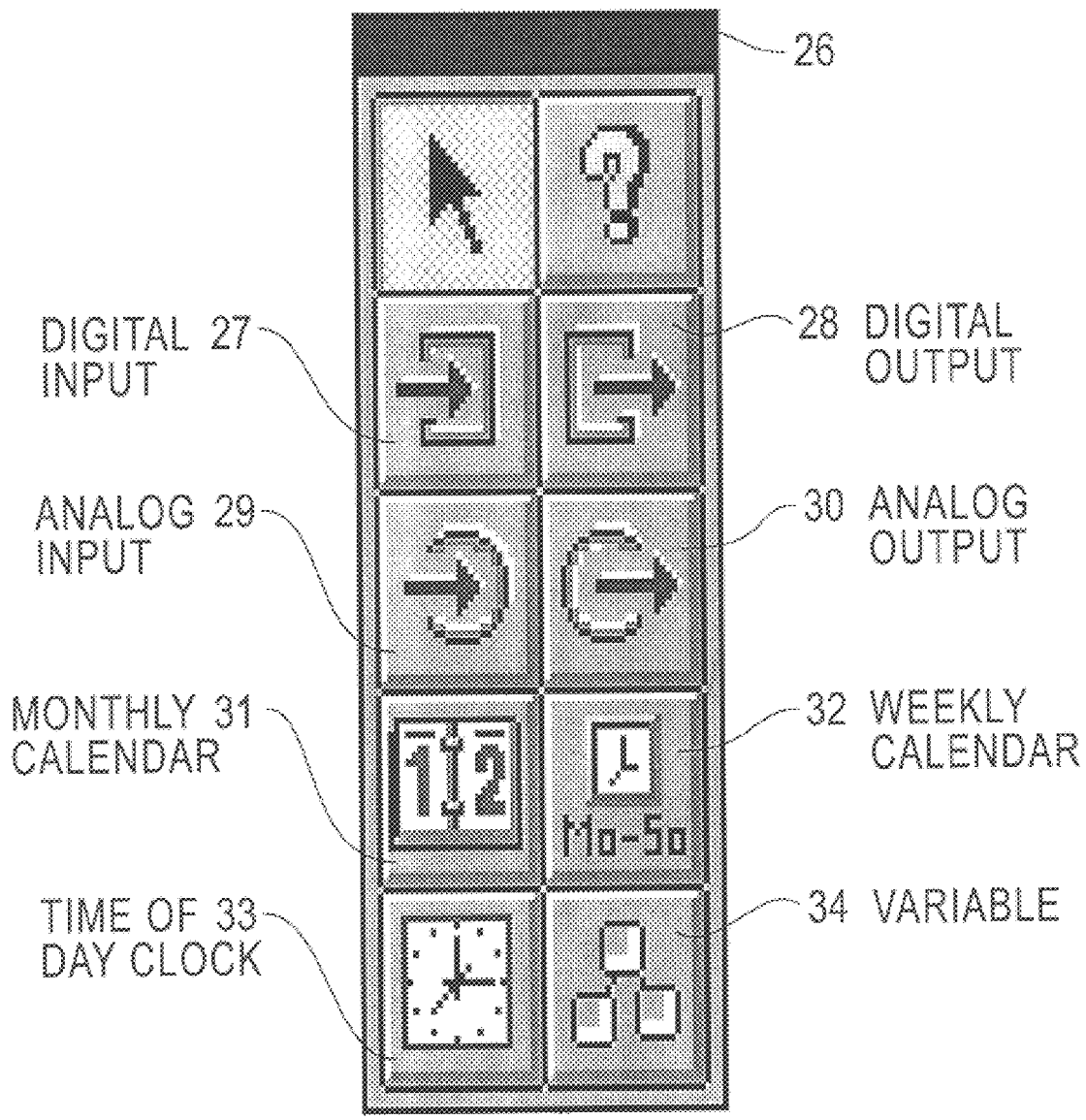
FIG. 5 shows, by way of example, an array of symbols of the user interface in accordance with the invention.

In FIG. 5, an exemplary array of symbols 26 is displayed which is composed in accordance with the interface types usually to be taken into consideration in the planning and design of a programmable controller. For each type, an associated node may be generated in an active program window, for example by operating the corresponding command button of the array of symbols 26 by means of a computer mouse, and be subsequently parameterized in an application-dependent manner, preferably by means of separate dialog windows. Thus the command button 27 serves for inserting a node with the property "digital output", the command button 29 serves for inserting the node with the property "analog input", command button 30 serves for inserting a node with the property "analog output", command button 31 serves for inserting a node with the property "monthly calendar", command button 32 serves for inserting a node with the property "weekly calendar", command button 33 serves for inserting a node with the property "time-of-day clock," and, finally, command button 34 serves for inserting a node with the property "variable".

Figure 6:
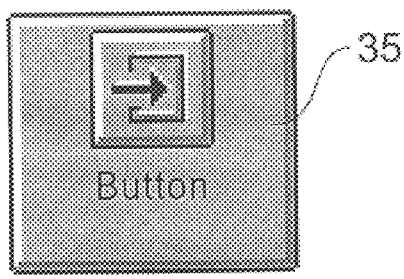
FIG. 6 shows, by way of example, a node of the user interface in accordance with the invention which has the property of a digital input.
Figure 7:
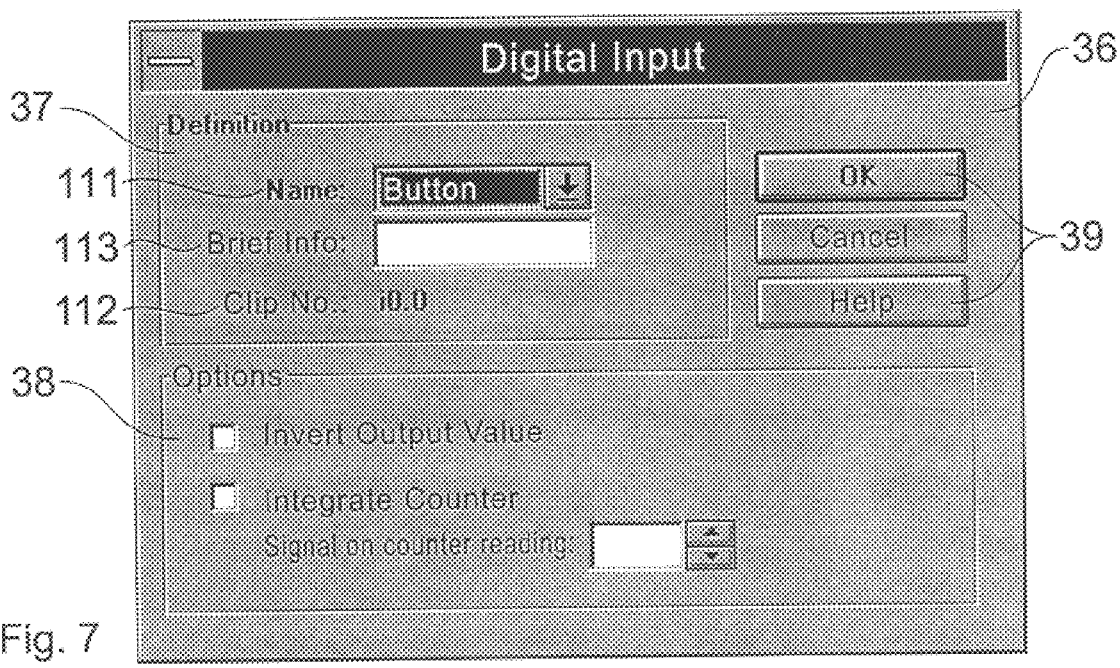
FIG. 7 shows, by way of example, a dialog window associated with the node of FIG. 6 for the pre-selection of its properties.

FIG. 6 shows by way of example a node 35 which is associated with an interface with the property "digital input" in the program window "ALARM.SPS" from FIG. 2 and which has the designation "BUTTON". The exemplary dialog window 36 represented below it in FIG. 7 serves for preselecting the properties of such a node. Thus the assignment to an interface of the programmable controller is performed by means of the "definition" input area 37. As shown in the clip display area 112 of FIG. 7, the term BUTTON has been assigned to clip No. i0.0 corresponding to the specifications of name column 11 and clip column 12 of program window 9 "ALARM.SPS" of FIG. 2 via name input area 111. Application-dependent "Brief Info" can be input via information input area 113. Finally, further settings of the interface selected under "Definition" can be made using the "Options" input area 38. In the example of FIG. 7, a setting can be made which will determine whether the output value of the node is to be inverted or whether an output signal is to be emitted via an integrating counter ("Integrate Counter") only after arrival of a predetermined number of binary input signals ("Signal on counter reading"). All preselections may be entered or rejected via acknowledgment input areas 39, which provide in accordance with the invention the functions OK, CANCEL, HELP in accordance with the customary WINDOWS® standard.

Figure 10:
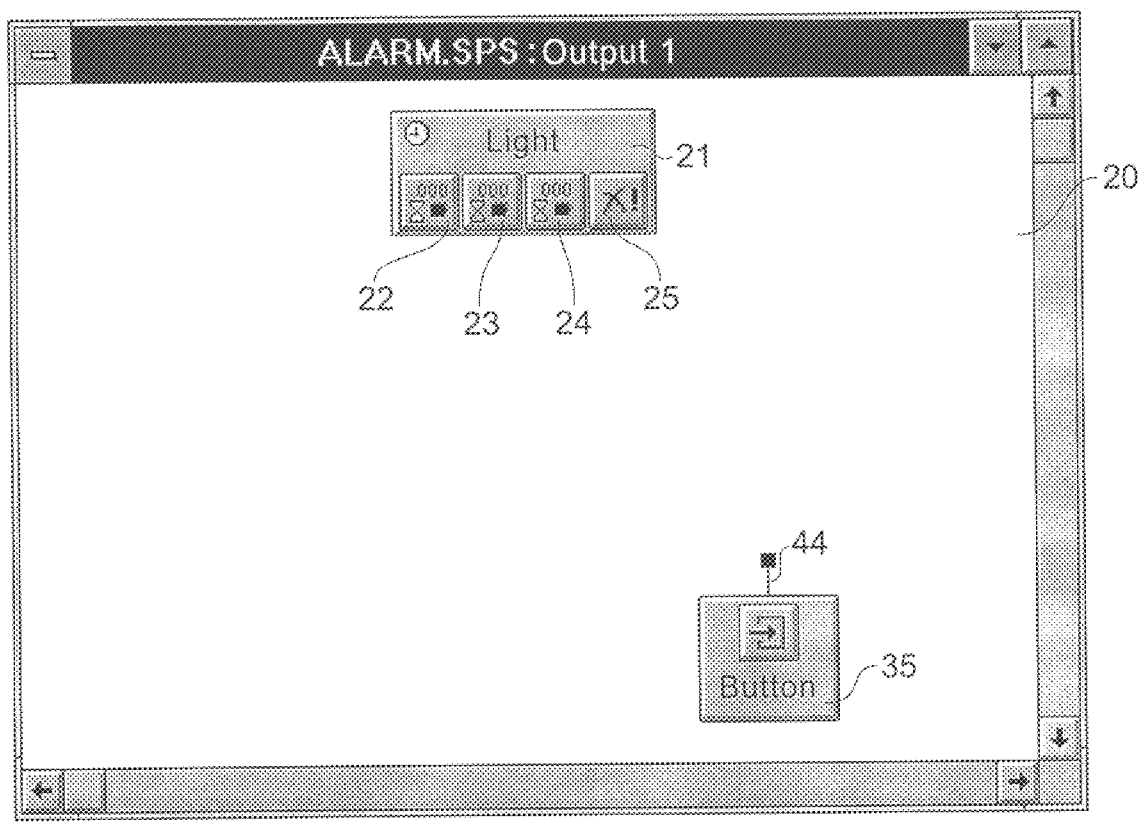
FIG. 10 shows the exemplary programming window from FIG. 4 in which an additional node is represented which, in accordance with the invention, is to be connected by graphical program linkage to the associated base node.

In FIG. 10, program window 20 for graphical program linkage of base node 21 with the designation "LIGHT", which is associated with output 1 of the program window "ALARM.SPS" in FIG. 3, is presented again along with branch inputs 22, 23, 24 and 25. In addition, this program window 20 contains the already explained node 35 with the designation "BUTTON". This node has at the upper end an output branch line 44, which is provided for the graphical program linkage of the node with the base node of the programming window or with other preceding nodes. Using a graphical user control means, for example a computer mouse, the end of output branch line 44, marked by a black square, can be brought to the base node 21 and deposited there. As a result, a linkage of the output signal of the "BUTTON" node 35 with the input of the "LIGHT" base node 21 can be accomplished both graphically and in terms of the program system. In terms of the control system, this thus has the consequence that a binary signal, generated by the actuation of the button, to the output branch line 44 of the node 35 activates or deactivates a light source connected to binary output 1, represented by base node 21. This graphical and control-system linkage of node 35 via output branch line 44 to base node 21 is represented in the left-hand region of program window 20 represented in FIG. 13.

In the case of the graphical user interface in accordance with the invention, a row-like graphical linkage of nodes establishes a control-system AND linkage of their output signals, while a graphical linkage of parallel nodes with another node or the base node establishes a control-system OR linkage of their output signals. This is depicted graphically in FIGS. 11, 12.

Figure 11:
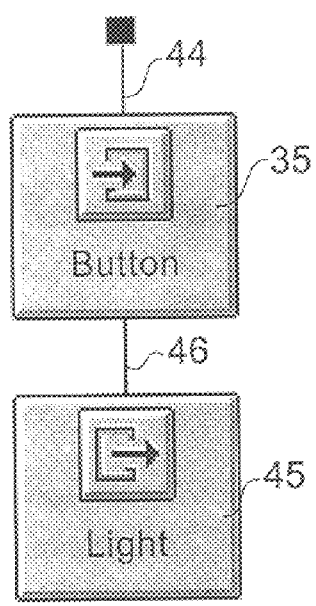
FIG. 11 shows, by way of example, a graphical program linkage of two nodes to form a logical AND linkage in accordance with the invention.

Thus FIG. 11 shows an example of a graphical program linkage of the two nodes 45 and 35 to form a control-system AND linkage. For this purpose, output branch line 46 of the "LIGHT" node 45 is linked with the preceding "BUTTON" node 35. As a result, an active binary signal is present at output branch line 44 of node 35 only if both an active binary signal is present on output branch line 46 of node 45, i.e., in the example the LIGHT is switched on, and node 35 itself generates a binary signal, i.e., in the example the BUTTON is activated. A signal of this kind on output branch line 44 can be employed for resetting an operator control means, for example for switching off the lamp at the LIGHT output.

Figure 12:
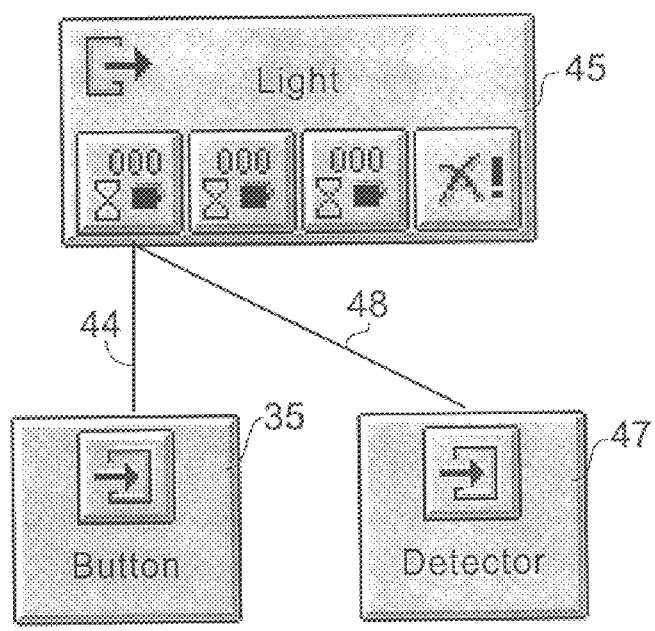
FIG. 12 shows, by way of example, a graphical program linkage of three nodes to form a logical OR linkage in accordance with the invention.

In a corresponding way, in FIG. 12 the graphical program linkage of the three nodes 35, 47, and 45 to form a control-system OR linkage is represented. For this purpose, both output branch line 44 of node 35 with the designation "BUTTON", and output branch line 48 of node 47 with the designation "DETECTOR", for example a so-called movement detector, which both have the "digital input" property and are associated with the program window "ALARM.SPS" represented by way of example in FIG. 2, are routed to base node 45 with the designation "LIGHT" and the property "digital output". This graphical program linkage of nodes 35 and 47 with the preceding node 45 have the consequence in the program window that an active binary signal occurs in base node 45, i.e., the LIGHT is switched on, whenever either an active signal occurs on output branch line 44 of node 35, i.e., the "BUTTON" is actuated, or an active signal occurs on output branch line 48 of node 47, i.e., the "DETECTOR" is active.

In FIG. 13, again using the example of a house alarm system, a simple but complete control program for a programmable controller is represented which was produced using the graphical user interface in accordance with the invention. In program window 20, the already explained base node 21 "LIGHT" for "output 1" of project window 90 "ALARM.SPS" of FIG. 3 is connected by way of example with nodes 35, 47, 49, 51 and 53. In this case, nodes 35, 47, 49, and 51 represent the "digital inputs" listed in project window 9 "ALARM.SPS" from FIG. 2, with the Names BUTTON 35 (Clip i0.0), DETECTOR 47 (Clip i0.2), SWITCH 49 (Clip i0.1), and ALARM 51 (Clip i0.3). The respectively associated output branch lines 44, 48, 50, and 52 are in each case linked to the base node 21 such that a control-system OR linkage of their output signals is obtained. Furthermore, the node 53 has the property of a so-called "TIME-OF-DAY CLOCK" and can be generated, for example, with the aid of the array of symbols 26 from FIG. 5, in program window 20 from FIG. 13. In the present example, this node is set, with the help of an additional dialog window which is comparable with the dialog window depicted in FIG. 14, such that there is an active signal on its output branch line 54 in the time period between 8:00 p.m. and 5:00 a.m., i.e., during the night hours. Since output branch 54 is linked with the preceding node 47 DETECTOR, a control-system AND linkage of their output signals is obtained.

Thus in the example represented in FIG. 13, the output 1, i.e., Clip q0.1, is activated in practice if either BUTTON 35 is actuated or SWITCH 49 is actuated, or ALARM 51 (window contact) is triggered, or if DETECTOR 47 has detected a movement and simultaneously TIME-OF-DAY CLOCK 53 is signaling the presence of a point in time which lies in period of time 8:00 p.m. to 5:00 a.m.

The invention offers many advantages. First, the program window has the advantage that a user is thereby given a complete and compact overview of the planning and design of a specific control task. The total number of interfaces which the programmable controller basically has is immediately evident. Furthermore, it is immediately evident which of the available input and output interfaces have been used in the planning and design of an application and to which associated terminal elements of the programmable controller, also known as clips, the external signal generators and operator control means are connected. It is also readily apparent what type of generators or operator control means these are and which designations they have been assigned to in the specific individual case.

In the case of the preferred embodiment of the project window, e.g., the example in FIG. 2 in which the interfaces of the controller are grouped according to type in folders, it is possible to switch over in a simple manner, for example between input and output interfaces and variables. Furthermore, a user is already familiarized with the graphical symbols which are assigned to the interface types. These are namely represented on the command buttons 10, 16, 17 along with a descriptive text thereunder. These graphical symbols are then available for selection, for example in the array of symbols 26 from FIG. 5, by means of a graphical operator control means, for example a computer mouse.

From a project window, the user can open the associated programming window either by "double clicking" with a graphical operator control means, for example a computer mouse, on one of the output interfaces listed there or a variable, or open the associated programming window through actuation of the OPEN command button in the acknowledgment input areas. If the programming window has already been opened, it is shown in the normal representation and is displayed in the foreground of the graphical user interface. Furthermore, the command buttons NEW, MODIFY, and OPEN, for example in FIG. 3, are advantageously set automatically to active or inactive when the user switches over between the various folders, i.e., the representation of the inputs, outputs, and variables.

The graphical editing capabilities in programming windows which are provided by the invention offer further advantages. For example, the creation of logical linkages of the nodes with one another and with the associated base node of a programming window, for example AND, OR, and NOT linkages, is possible in a simple manner and is subsequently documented at the same time in a graphically clear manner. The dialog windows of the nodes for setting their properties can, in particular, be activated by actuating the property command button on the node by means of a graphical operator control means. It is regarded as a particular advantage that the graphic representation of the control program application put together by a user always assumes the form of a so-called tree, since the output branch line of each node can branch only to one preceding other node, but the output branch lines of any number of following nodes can branch from a single preceding node. Whether branching is complete can be recognized in a simple way from the position of the respective output branch line. As a warning, a still unconnected output branch line may be represented in a color, so that, at the end of programming, there should no longer be any colored output branch lines from nodes.

According to a further embodiment of the invention, the graphical user interface causes a node, after its output branch line is linked with the base node or with another node, in the programming window to always be graphically displayed below the base node or the other node. Such a structure is already represented in the examples of FIGS. 11, 12, 13, and 16. Furthermore, it may be advantageous to restrict the moving of nodes and the base node in the programming window by the graphical user interface such that a predecessor node is always placed spatially above its successor node. As a result, the tree diagram of the respective controller always remains clear. Finally, the displacing of the nodes in the programming window may also be restricted such that a user cannot push marked nodes out of the window to the left or to the top. If a user displaces nodes to the right or towards the bottom, so-called scroll bars are advantageously superimposed at the edge of the programming window.

In the case of a further advantageous embodiment of the graphical user interface, the base node of a programming window has at least one separate branch input by means of which it is possible to link the base node with the output branch line of at least one node in a parameterizable fashion. By means of such a branch input, it is preferably possible, with the aid of an additional associated dialog window, to preselect time conditions and further logical switching conditions which have to be satisfied before an output signal fed from an attached node via the corresponding output branch line becomes effective in the base node. Advantageously, when the base node of a programming window has at least two separate branch inputs, a control-system OR linkage of their output signals is effected upon a graphical linkage of nodes with the branch inputs.

Such an embodiment of the invention is already represented in FIGS. 4, 10, and 13 and will be explained with reference to the example of FIG. 13. Base node 21 of programming window 20 advantageously has first, second, third, and fourth branch inputs 22, 23, 24, 25. The output branch lines of any nodes can be linked with these branch inputs. In the example of FIG. 13, nodes 35 "BUTTON" and 47 "DETECTOR" are linked with branch input 22, node 49 "SWITCH" is linked with branch input 23, and node 51 "ALARM" is linked with branch input 24. By parameterizing the properties of the branch inputs, various conditions, preferably time conditions, can be preselected. By means of branch input 25, a blocking of base node 21 can be accomplished, i.e., a so-called RESET is produced, as long as an active signal is fed from the attached node (not shown). The properties of, for example, branch inputs 22 and 24 may be preselected using dialog windows 55 "PROPERTIES OF BRANCH 1" and 61 "PROPERTIES OF BRANCH 3", represented by way of example in the following FIGS. 14 and 15.

Figure 14:
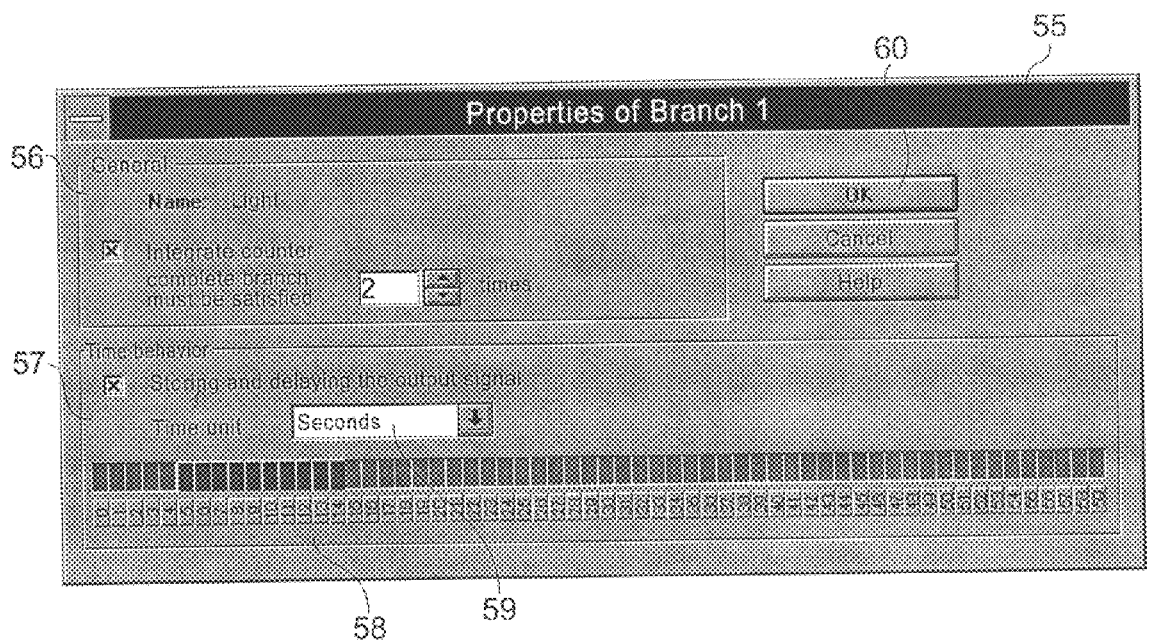
FIG. 14 shows, by way of example, a dialog window associated with the first branch of the base node of FIG. 13 for the pre-selection of its properties.
Figure 15:
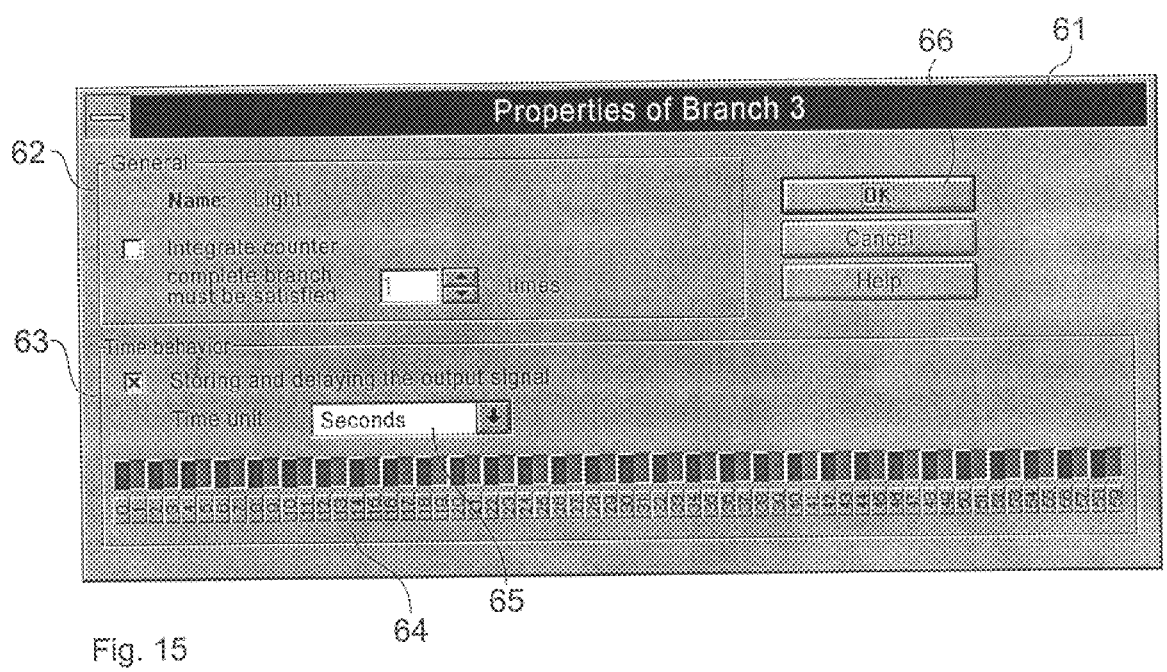
FIG. 15 shows, by way of example, a dialog window associated with the third branch of the base node of FIG. 13 for the pre-selection of its properties.

Thus dialog window 55 of FIG. 14 has a "General" input area 56 for setting general switching conditions of branch input 22. This may be used, for example, to preselect an integrating counting switching condition. An output signal of a node which is present at the branch input 22 consequently does not act on the base node 21 until the output signal has occurred with a preselected frequency. A further input area 57 "Time Behavior" serves for setting time conditions of the branch input. In this case, a switchable time bar 58, which has 60 switching points whose "Time Unit" is preselectable via the preselection area 59, can be used to impart a parameterizable switching behavior on an output signal fed in at the branch input. The preselections in the dialog area of FIG. 14 can finally be activated or rejected in the customary way via acknowledgment input areas 60. In FIG. 15, a corresponding dialog window 61 of base node 21 of FIG. 13 is represented. In this case, the elements there with the reference numerals 62, 63, 64, 65, and 66 correspond to the elements already explained in FIG. 14 with reference numerals 56, 57, 58, 59, and 60, respectively.

A user recognizes from the title of the dialog window for which branch the settings are made. The name of the associated output or variable for which the branch dialog applies is also indicated, in the example of FIGS. 14 and 15 for the Name "LIGHT". This gives a user the possibility of activating a counter function. Storing and delaying the output of the variable can be preselected in a simple way in the time bar. The input of the desired counter reading may be performed by means of a so-called spin switch or by text input.

Figure 8:
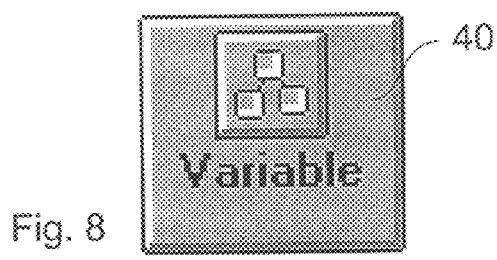
FIG. 8 shows, by way of example, a further node of the user interface in accordance with the invention which has the property of a variable.
Figure 9:
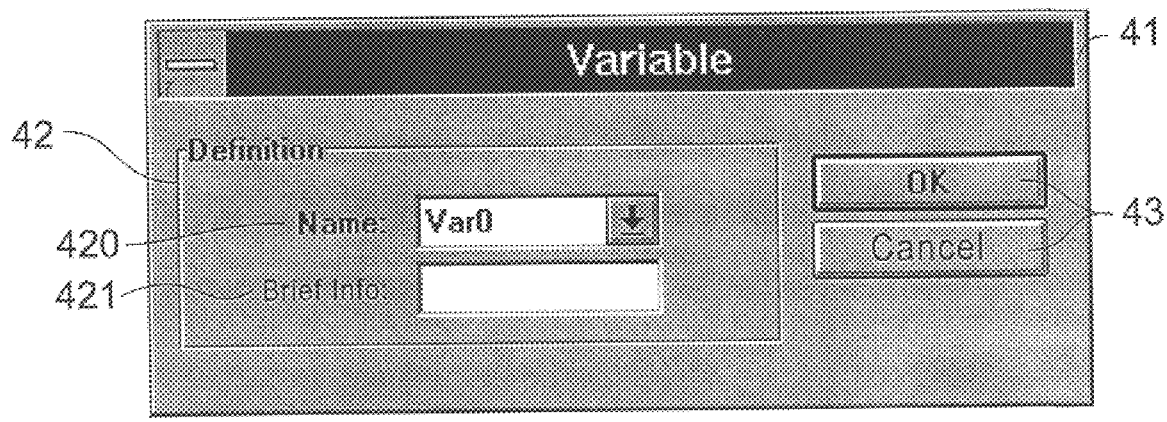
FIG. 9 shows, by way of example, a dialog window associated with the node of FIG. 8 for the pre-selection of its properties.

Advantageously, a group of interfaces of the programmable controller can be assigned a separate node with its own programming window, in which the control-system linkage of the nodes of the group of interfaces takes place by graphic linkage of the corresponding output branch lines. In FIG. 8, such a node 40 "Var0" with the property "variable" is represented. This node may be assigned application-specific codes by means of dialog window 41 represented in FIG. 9. Dialog window 41 is shown with definition input area 42 and acknowledgement input area 43, which are similar in concept and structure to areas shown in, e.g., FIG. 7. Thus in name input area 420, the variable may be assigned a NAME corresponding to the corresponding control task. In a following information input area 421, additional "brief info" may be defined in plain text. Variables defined in this way are then available for a control task in the associated project window, for example project window 9 of FIG. 2, and may be displayed by actuation of the corresponding command button 10. Advantageously, all the variables of a project are likewise grouped together in the form of a folder.

In its own programming window, assigned to a variable, which window has approximately the same structural design as the programming window 20 represented in FIG. 4, any number of nodes of a project and also other already-defined variables of a project may be combined to form a separate control program. The base node of the associated project window is in this case not assigned to an output of the programmable controller, but represents the output of the variable. A variable may be incorporated into the programming window of a project once or more than once as an independent node and be combined there with other nodes in the manner in accordance with the invention. With such a variable, linkages of specific interfaces of a controller which are repeatedly required, for example in a possibly complex "programming tree" of a programming window, may be combined to form an independent node. As a result, the clarity and error-free linkability of the nodes in this programming window is facilitated.

Figure 16:
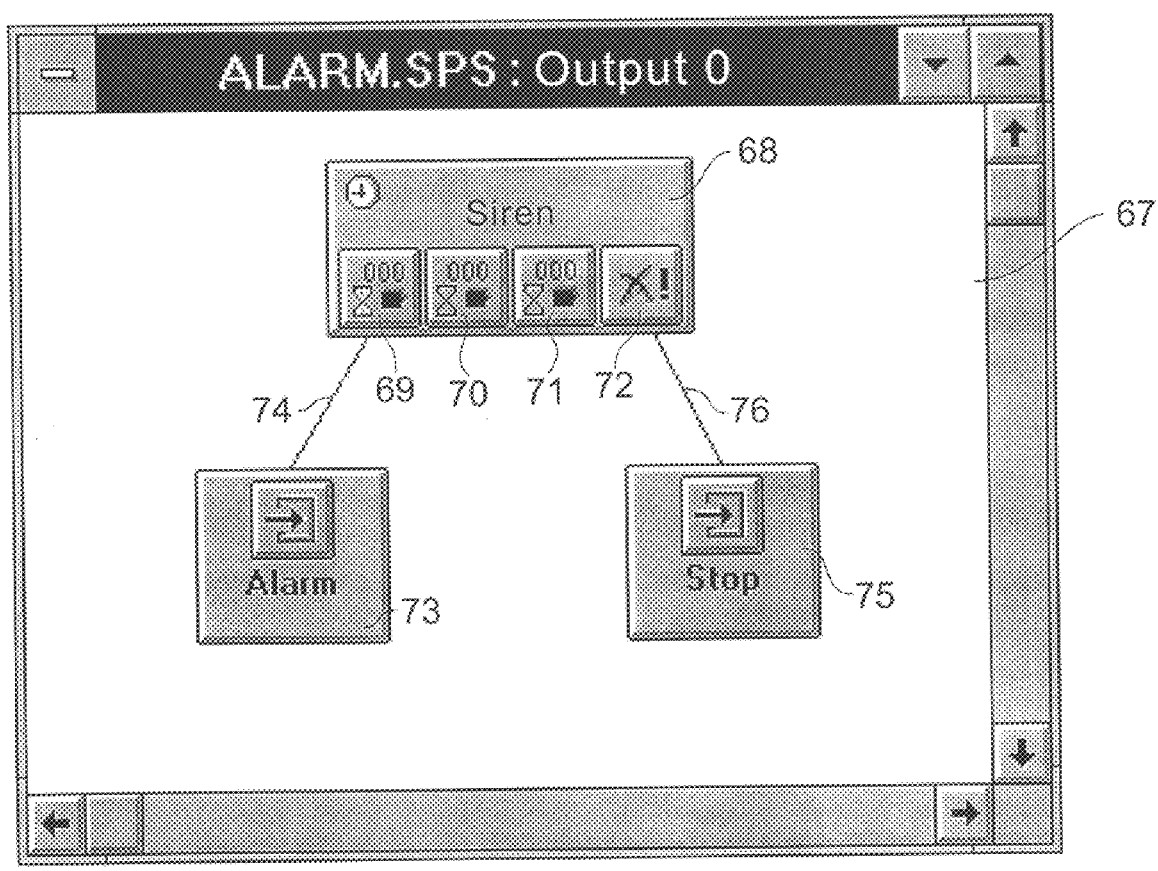
FIG. 16 shows a further exemplary programming window in which nodes from the project window of FIG. 2 are connected in accordance with the invention by graphical program linkage to form a control program for output 0 of a programmable controller according to the project window of FIG. 3.

In conclusion, FIG. 16 shows a programming window 67 for the graphical program linkage of the base node 68 with the designation "SIREN", which is associated with output 0 of the exemplary project window "ALARM.SPS" in FIG. 3. Since in the case of the associated programmable controller according to FIG. 3, only the interfaces of the type "digital output" associated with terminal elements Clip q0.0 and q0.1 are occupied, the programming window in FIG. 16 represents the complement of programming window 20 represented in FIG. 13 for output 1. Base node 68 consequently serves in the example for activating a siren connected to Clip q0.0 of the programmable controller.

According to an already explained embodiment of the invention, base node 68 also has several branch inputs, in the example branch inputs 69, 70, 71, and 72. Advantageously, additional time conditions for actuation of incoming signals can be included in the planning and design by means of branch inputs 69, 70, 71, and 72. These branch inputs are consequently comparable with branch inputs 22, 23, 24, and 25 explained with reference to the example of FIG. 13. Branch input 72 of base node 68 in turn represents the so-called RESET branch which deactivates base node 68 as long as an active signal is present. Its function is consequently comparable with branch input 25 of base node 21 from FIG. 13. The preselection of the properties of branch inputs 69, 70, 71, and 72 may in turn take place with the aid of dialog windows which correspond to those represented in FIGS. 14 and 15.

In the example of FIG. 16, a node 73 "ALARM" with the property "digital input" from the project window "ALARM.SPS" from FIG. 2 is combined by graphical program linkage via its output branch line 74 with the preceding base node 68. Furthermore, in program window 67 of FIG. 16, a node 75 "STOP" with the property "digital input", which has likewise been generated from programming window "ALARM.SPS" of FIG. 2, has been combined by graphical program linkage via its output branch line 76 with the preceding base node 68. In terms of the control system, these linkages have the consequence that the SIREN connected to binary output 0 of the controller is activated whenever an alarm has been triggered by means of the generator connected to binary input Clip i0.3 WINDOW CONTACT according to FIG. 2. The alarm signal may be interrupted by means of a further generator (Info: "switches siren off"), connected to binary Clip i0.4 according to FIG. 2.

A control program created, i.e., edited, using the graphical user interface in accordance with the invention may then be converted into a control code by a "compiling" command contained in menu 6 "PROGRAM" of the main program window 1 from FIG. 1. This code is finally loaded into the programmable controller and can be cyclically processed there as the actual control program.

The invention has the advantage that it is consequently possible even for users who have no experience in the planning and design of controllers to create a control program in a simple and error-free manner.

The above description of the preferred embodiments has been given by way of example. From the disclosure given, those skilled in the art will not only understand the present invention and its attendant advantages, but will also find apparent various changes and modifications to the structures and operations disclosed. It is sought, therefore, to cover all such changes and modifications as fall within the spirit and scope of the invention, as defined by the appended claims, and equivalents thereof.

What is claimed is:

1. A graphical user interface for programming a programmable controller, comprising:
   a) a plurality of output interfaces, which graphically represent operational outputs to physical external devices;
   b) a plurality of programming windows assigned respectively to each said output interface, whereby each particular one of said windows contains
      i) a base node as a first graphical operating element for said respective output interface and
      ii) at least one additional node as an additional graphical operating element for an input interface or for a group of linked interfaces of the programmable controller, wherein said additional node comprises at least one output branch line having a free end which is actuable to be coupled, in a coupling operation, to said base node or to a further additional node with a graphical operating means, wherein said at least one additional node is independently graphically displayed as having said output branch line with said free end prior to commencing said coupling operation between said at least one additional node and said base node or said further additional node;
   wherein coupling the free end of the output branch line of said additional node to said base node or to the further additional node in said coupling operation establishes both a graphical and a control-system linkage between the coupled nodes.

2. The graphical user interface according to claim 1, further comprising at least one project window, and wherein said interfaces of the programmable controller are grouped in the project window.

3. The graphical user interface according to claim 2, further comprising a plurality of command buttons, and wherein said interfaces of the programmable controller are grouped in the project window and sorted according to respective functions in graphical folders activated by means of said command buttons.

4. The graphical user interface according to claim 1, wherein a series graphical linkage between the coupled nodes produces a control-system AND linkage of output signals of the coupled nodes.

5. The graphical user interface according to claim 1, wherein said particular window contains at least a second additional node in a parallel graphical linkage with said one additional node to said base node or another node, and wherein the parallel graphical linkage produces a control-system OR linkage of output signals of the one additional node and the second additional node.

6. The graphical user interface according to claim 1, wherein the linkage of said additional node to said base node or to the further node is displayed graphically in said particular programming window with said additional node oriented below said base node or the further node.

7. The graphical user interface according to claim 1,
   wherein a separate node with a separate respective one of said programming windows is assigned to a group of said interfaces of the programmable controller,
   wherein the group of said interfaces has a respective group of nodes, and
   wherein, in said separate programming window, the control-system linkage between the group of nodes of the group of interfaces is established by a graphical linkage of the respective group of nodes.

8. The graphical user interface according to claim 1, wherein said base node of the particular programming window has at least one branch input for establishing a parameterizable linkage with the output branch line of said additional node.

9. The graphical user interface according to claim 1, wherein the further additional node of the particular programming window has at least one branch input for establishing a parameterizable linkage with the output branch line of said additional node.

10. The graphical user interface according to claim 1 wherein said base node of the particular programming window has at least two separate branch inputs, and respective graphical linkages of said one additional node and another node with the two branch inputs produces a control-system OR linkage of the output signals of the one additional node and the other node.

11. The graphical user interface according to claim 1 wherein the further additional node of the particular programming window has at least two separate branch inputs, and respective graphical linkages of said one additional node and another node with the two branch inputs produces a control-system OR linkage of the output signals of the one additional node and the other node.

12. The graphical user interface according to claim 8, wherein the at least one branch input, through which the parameterizable linkage with the output branch line of said additional node is established, is configured such that said additional node associated with the branch input is blocked for a duration during which there is a signal from at least one other node.

13. The graphical user interface according to claim 9, wherein the at least one branch input, through which the parameterizable linkage with the output branch line of said additional node is established, is configured such that said additional node associated with the branch input is blocked for a duration during which there is a signal from at least one other node.

14. The graphical user interface according to claim 1, wherein said particular window contains at least a second additional node linked to said additional node for parameterizing a time condition for said additional node.

15. The graphical user interface according to claim 14, wherein the parameterized time condition is a time delay.

16. The graphical user interface according to claim 1, wherein said graphical operating means for coupling the output branch line to said base node or to the further additional node is a computer mouse.

17. A method comprising the steps of:
   in a graphical user interface, assigning a programming window to each of a plurality of output interfaces of a programmable controller, wherein said output interfaces graphically represent operational outputs to physical external devices;
   providing a base node as a first graphical operating element for each of said programming windows;
   providing at least one additional node as an additional graphical operating element, said at least one additional node having at least one output branch line;
   independently graphically displaying said at least one additional node as having said output branch line with said free end prior to commencing a coupling operation between said at least one additional node and said base node or said further additional node; and
   commencing said coupling operation, wherein said coupling operation establishes both a graphical link on said graphical user interface and a control-system link in said programmable controller between said at least one additional node and said base node or a further additional node by connecting said output branch line to said base node or said further additional node.

18. The graphical user interface according to claim 3, wherein said respective functions comprise analog inputs, analog outputs, digital inputs, digital outputs, and variables, and wherein said project windows display the interfaces in a textual array format that includes at least name and clip information for each interface.

19. The graphical user interface according to claim 8, wherein said at least one branch input is separately graphically displayed within the graphical representation of said base node, and wherein said at least one branch input has an associated dialog window for selecting properties of said at least one branch input.

20. The graphical user interface according to claim 9, wherein said at least one branch input is separately graphically displayed within the graphical representation of said further additional node, and wherein said at least one branch input has an associated dialog window for selecting properties of said at least one branch input.

21. A graphical user interface for programming a programmable controller, comprising:

a) a plurality of output interfaces, which graphically represent operational outputs to physical external devices;
b) a plurality of programming windows assigned respectively to each said output interface, whereby each particular one of said windows contains
   i) a base node as a first graphical operating element for said respective output interface and
   ii) at least one additional node as an additional graphical operating element for an input interface or for a group of linked interfaces of the programmable controller, wherein said additional node comprises at least one output branch line having a free end which is actuable to be coupled to said base node or to a firther additional node with a graphical operating means, wherein said at least one additional node is independently graphically displayed as having said output branch line with said free end prior to being coupled to said base node or said further additional node;
wherein coupling the free end of the output branch line of said additional node to said base node or to the further additional node establishes both a graphical and a control-system linkage between the coupled nodes;
wherein a series graphical linkage between two of the coupled nodes produces a control-system AND linkage of output signals of the two coupled nodes; and
wherein a parallel graphical linkage between a pair of the coupled nodes produces a control-system OR linkage of output signals of the pair of coupled nodes.

22. A method comprising the steps of:
   in a graphical user interface, assigning a programming window to each of a plurality of output interfaces of a programmable controller, wherein said output interfaces graphically represent operational outputs to physical external devices;
   providing a base node as a first graphical operating element for each of the programming windows;
   providing at least one additional node as an additional graphical operating element, the additional node having at least one output branch line; and
   establishing both a graphical link on the graphical user interface and a control-system link in the programmable controller between the base node and the additional node by connecting the output branch line to the base node;
wherein said at least one additional node is independently graphically displayed as having said output branch line with said free end prior to being coupled to said base node;
wherein a series graphical linkage between two of the coupled nodes produces a control-system AND linkage of output signals of the two coupled nodes; and
wherein a parallel graphical linkage between a pair of the coupled nodes produces a control-system OR linkage of output signals of the pair of coupled nodes.

* * * * *